Feb. 13, 1968        H. E. BEARSS        3,368,530
ANIMAL HOLDER AND RESTRAINING DEVICE
Filed Feb. 17, 1966        2 Sheets-Sheet 1
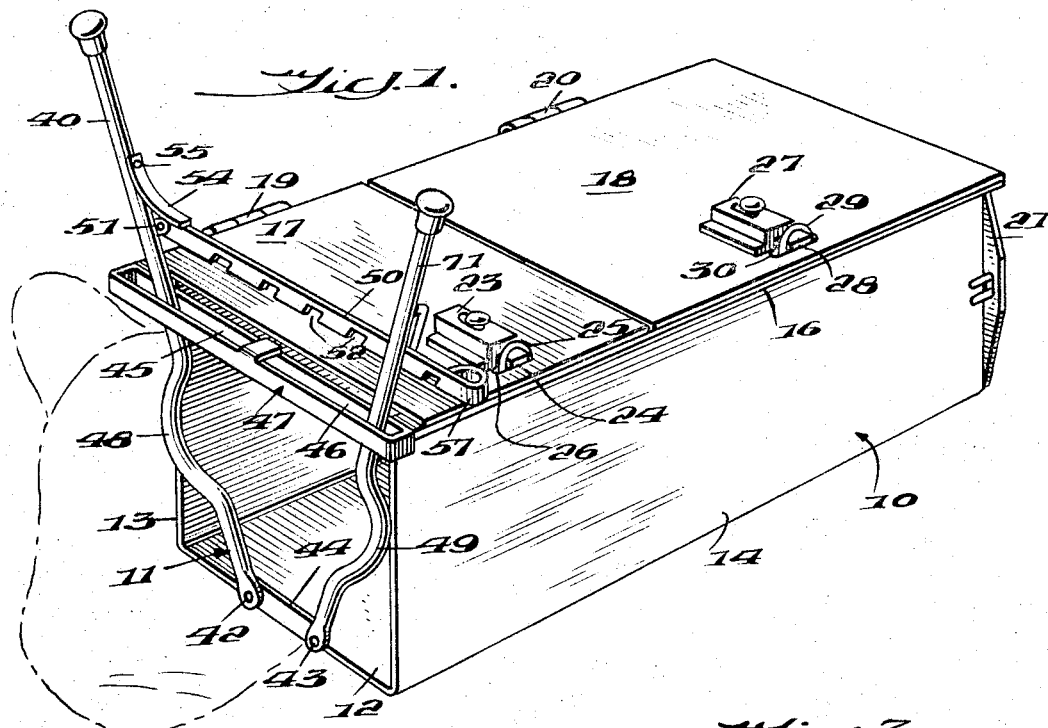
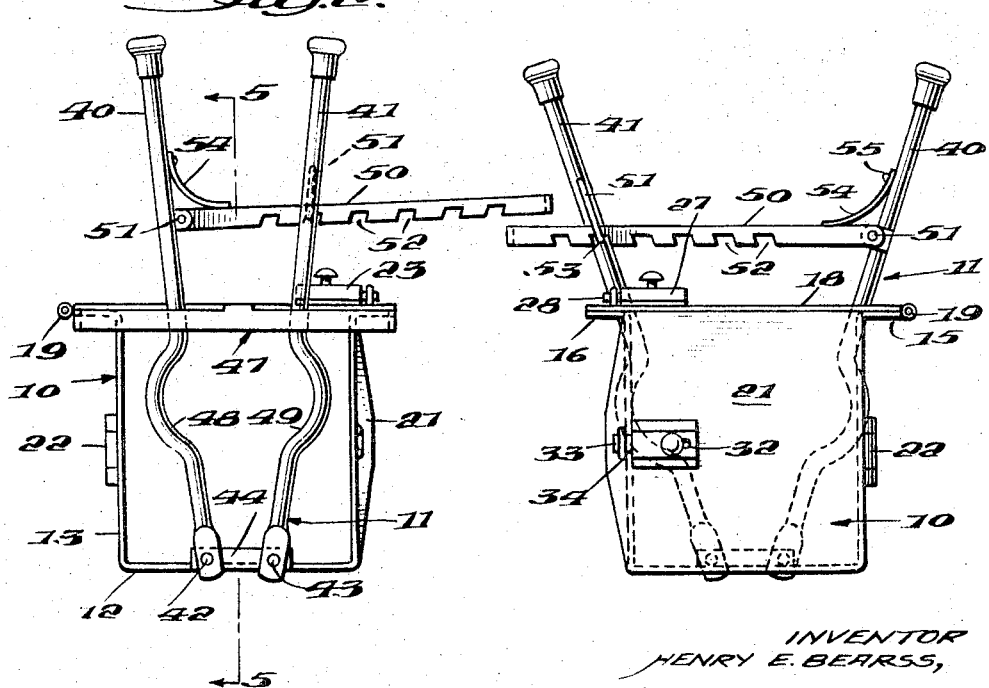
INVENTOR
HENRY E. BEARSS,
BY Chas. H. Trotter
ATTORNEY

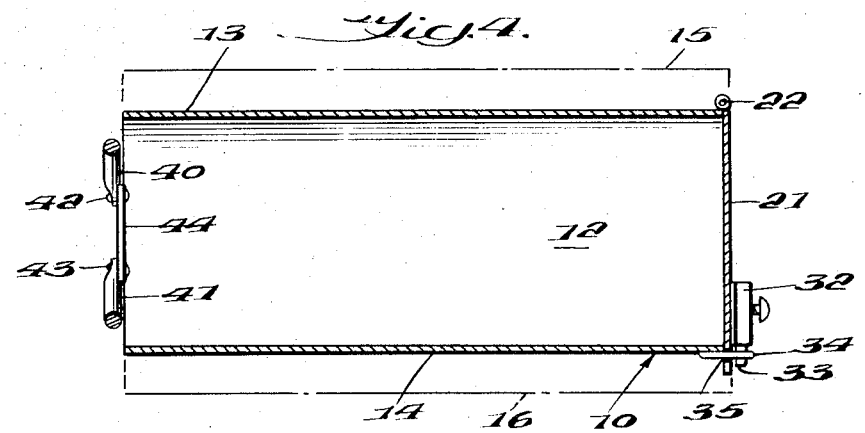
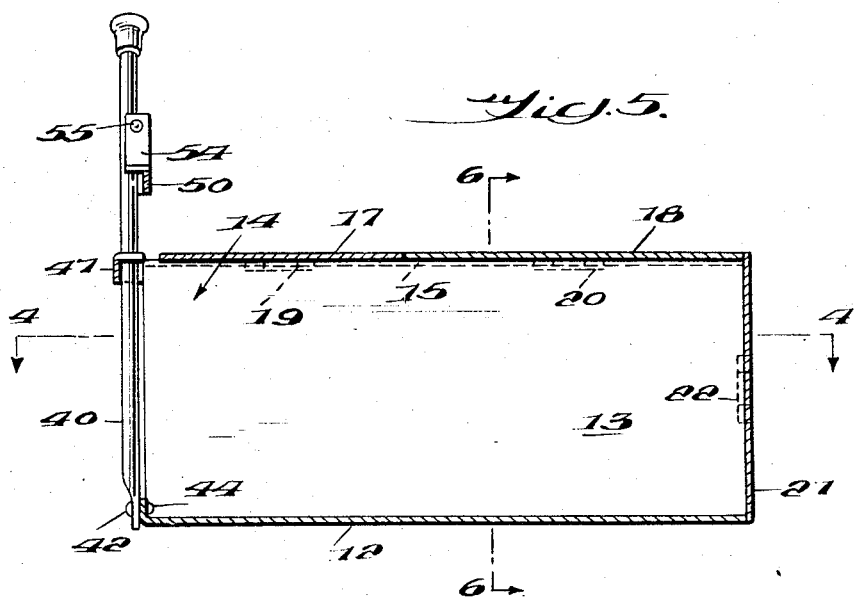
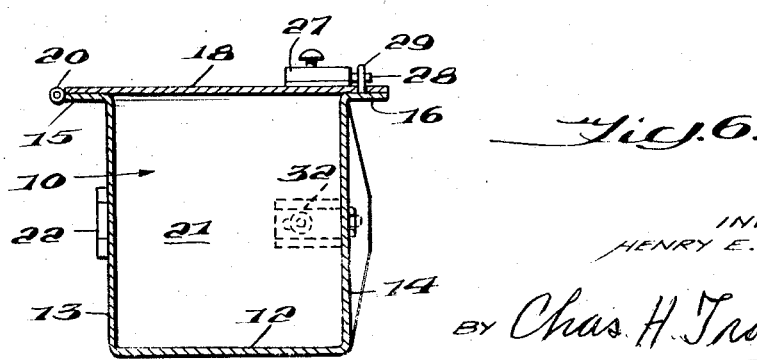

United States Patent Office 3,368,530
Patented Feb. 13, 1968

3,368,530
ANIMAL HOLDER AND RESTRAINING DEVICE
Henry E. Bearss, 724 Chestnut St.,
Minonk, Ill. 61760
Filed Feb. 17, 1966, Ser. No. 528,275
1 Claim. (Cl. 119—99)

ABSTRACT OF THE DISCLOSURE

An elongated rectangular housing which is open at the forward end thereof and is closed at the rear end thereof by a door, means secured to the forward end of the housing which is adapted to releasably grip the neck of a small animal disposed within the housing with its head extending out through the open end of the housing, the top wall of the housing being provided with openings through which access is had for treating different body sections of an animal within the housing, and hinged lids by which said openings are closed.

---

This invention relates to a restraining device for holding a small domestic animal, especially a cat, during medical, surgical or other treatment thereof.

The principal object of the invention is to provide a small animal restraining device which will hold an active animal immobile in such a position that it cannot scratch or bite an attendant during treatment, or injure itself.

Another object of the invention is to provide a device of the aforesaid character that is so constructed and arranged that access may be readily had to various body sections of an animal confined therein.

Another object of the invention is to provide a restraining device of the aforesaid character that is very effective in use, but which is of simple construction and can be easily and inexpensively manufactured.

Still another object of the invention is to provide a portable device of the aforesaid character which is equally well adapted for either veterinary or home use.

Having stated the principal objects of the invention, other and specific objects thereof will be apparent from the following specification and the accompanying drawings forming a part thereof in which:

FIGURE 1 is a perspective view of a restraining holder for small animals which is constructed in accordance with my invention, with the neck securing means shown in open inoperative position;

FIG. 2 is a front elevation of the device shown in FIG. 1, with the neck securing means being shown in closed operative position;

FIG. 3 is a rear elevation thereof;

FIG. 4 is a horizontal sectional view on the line 4—4 on FIG. 5;

FIG. 5 is a vertical sectional view taken on the line 5—5 of FIG. 2; and

FIG. 6 is a transverse sectional view, the plane of which is indicated by the line 6—6 on FIG. 5.

Referring now to the drawings by reference characters, the device comprises an elongated rectangular housing generally indicated by the numeral 10, and a neck securing means generally indicated by the numeral 11.

The housing 10, which is preferably formed from light thin sheet metal, comprises an elongated rectangular bottom wall 12 and a pair of spaced parallel side walls 13 and 14 which are integral with and extend upwardly from the side edges of the bottom wall 12. The upper ends of the side walls 13 and 14 terminate in outwardly extending horizontal flanges 15 and 16 respectively. The top of the housing 10 is closed by animal access operating lid 17, which is disposed adjacent the forward end of the housing 10, and by animal access operating lid 18 which is disposed adjacent the rear end of housing 10. The lid 17 is pivotally secured to the free edge of the flange 15 by a hinge 19; and the lid 18 is pivotally secured to the free edge of the flange 15 by a hinge 20. The rear end of the housing 10 is closed by door 21 which is pivotally secured to the rear end of the side wall 13 by a hinge 22. The forward end of the housing 10 is open.

The lid 17 is releasably held in closed position by a latch 23 having a spring pressed slidable bolt 24 which is adapted to engage a keeper 25 which is secured to the flange 16 and extends upwardly therefrom through a slot 26 in the lid 17; and the lid 18 is releasably held in closed position by a latch 27 having a spring pressed slidable bolt 28 which is adapted to engage a keeper 29 which is secured to the flange 16 and extends upwardly therefrom through a slot 30 in the lid 18. The door 21 is releasably held in closed position by a latch 32 having a spring pressed slidable bolt 33 which is adapted to engage a keeper 34 which is secured to the side wall 21 and extends rearwardly therefrom through a slot 35 in the door 21.

The neck securing means 11, which is disposed at the forward open end of the housing 10, comprises a pair of transversely aligned similar yoke arms 40 and 41. The lower ends of the arms 40 and 41 are pivotally connected in closely spaced relation to each other, as indicated at 42 and 43, to a bracket 44 which is secured to and extends upwardly from the forward end of the bottom wall 12 intermediate the side walls 13 and 14. The arms 40 and 41 extend upwardly from their respective pivots 42 and 43 through elongated guide slots 45 and 46 respectively in a retainer 47 which is secured, across the open end of the housing 10, to and between the upper ends of the side walls 13 and 14 and the flanges 15 and 16. The arms 40 and 41 are adapted to be moved toward and away from each other, about their pivots 42 and 43, in the slots 45 and 46 which are provided to maintain the arms 40 and 41 in alignment with each other during back and forth movement thereof. The arms 40 and 41 are provided with opposed oppositely extending arcuate sections 48 and 49 which are adapted, when moved from the inoperative position shown in FIG. 1 to the operative position shown in FIG. 2, to encompass and firmly grip the neck of an animal which extends out from the housing 10 through the open end thereof between the arms 40 and 41.

In order to maintain the arms 40 and 41 in adjusted neck gripping position I provide an elongated horizontally disposed thin narrow bar 50 which is pivotally connected at one end thereof to the arm 40, as indicated at 51, and extends therefrom slidably through a U-shaped keeper 51 which is secured to the arm 41. The lower edge of the bar 50 is provided with a plurality of notches 52 which are adapted to selectively straddle the lower horizontal leg 53 of the keeper 51 and thereby prevent movement of the arms 40 and 41 with respect to each other. A leaf spring 54 having one end thereof secured to the arm 40, as indicated at 55, and the free end thereof bearing against the upper edge of the bar 50 is provided to yieldingly bias the bar 50 downwardly into engagement with the horizontal leg 53 of the keeper 51. In order to release the arms 40 and 41 from operative neck engaging position it is only necessary to raise the free end 57 of the bar 50 until the notches 52 clear the horizontal leg 53 of the keeper 51. The arms 40 and 41 can then be returned from the closed operative neck gripping position as shown in FIG. 2, to the open position as shown in FIG. 1.

In use an animal to be treated may be placed in the housing 10 with its head and neck extending out through the open end thereof between the opened arms 40 and 41, by opening the door 21 and inserting it through the rear end thereof, or one of the lids 17 or 18 may be opened and the animal inserted through the top of the housing. The arms 40 and 41 are then moved to closed operative position about the neck of the animal. The animal is thereby restrained against any movement which may injure an attendant treating it or harm the animal itself. Different parts of the animal within the housing 10 may then be treated either through the rear end or the top of the housing by opening the dor 21 or one of the lids 17 or 18.

From the foregoing it will be apparent to those skilled in this art that I have provided a very simple and effective device for accomplishing the objects of the invention.

It is to be understood that I am not limited to the specific construction shown and described herein as various modifications may be made therein within the spirit of the invention and the scope of the appended claim.

I claim:

1. A veterinary animal holder and restraining device of the character described comprising, a housing which is open at the forward end thereof and is adapted to secure an animal therein with its head and neck extending out through the said opening; and neck securing means pivotally connected to said housing for transverse neck gripping and releasing movement across the open forward end of said housing; the rear end of said housing being provided with an independently operated door which is hingedly connected thereto for swinging movement between open animal operative and closed positions, the top of said housing being provided with a first access lid and a second access lid which are hingedly connected thereto for swinging movement between open animal operative and closed positions, one of said lids being disposed adjacent the forward open end of said housing and the other of said lids being disposed adjacent the rear end of said housing, said door and said lids being each provided with individual latching means by which said door and said lids are adapted to be releasably maintained in closed position; said neck securing means comprising a pair of similar upwardly extending transversely aligned arms, means pivotally connecting the lower ends of said arms to the bottom of said housing for swinging movement toward and away from each other between inoperative and operative positions, said arms being provided with opposed similar oppositely extending arcuate sections which are adapted to encompass and firmly grip the neck of an animal when said arms are moved toward each other from inoperative to operative position, an elongated thin narrow bar which is pivotally connected at one end thereof to one of said arms and slidably extends through a keeper carried by the other of said arms, a plurality of longitudinally spaced notches which are formed in the lower edge of said bar and are adapted to straddle a section of said keeper to maintain said arms in adjusted position with respect to each other, and spring means which is carried by one of said arms is provided to yieldingly bias said bar into engagement with the said section of said keeper.

References Cited

UNITED STATES PATENTS

| | | | |
|---|---|---|---|
| 2,498,051 | 2/1950 | Shipley | 119—99 |
| 3,020,882 | 2/1962 | Browning | 119—99 X |
| 3,094,101 | 6/1963 | Porter | 119—103 |
| 3,161,176 | 12/1964 | Derry | 119—99 |
| 3,187,721 | 6/1965 | Cappel | 119—103 |

FOREIGN PATENTS 242,798  1/1963  Australia.

ALDRICH F. MEDBERY, *Primary Examiner.*